Nov. 21, 1933.  R. E. CROSSLEY  1,936,549
ELECTRIC LAMP CONSTRUCTION FOR VIADUCTS
Filed Aug. 14, 1930   2 Sheets-Sheet 1

INVENTOR.
Royal E. Crossley
BY
Bodell + Thompson
ATTORNEYS.

Nov. 21, 1933.  R. E. CROSSLEY  1,936,549
ELECTRIC LAMP CONSTRUCTION FOR VIADUCTS
Filed Aug. 14, 1930  2 Sheets-Sheet 2
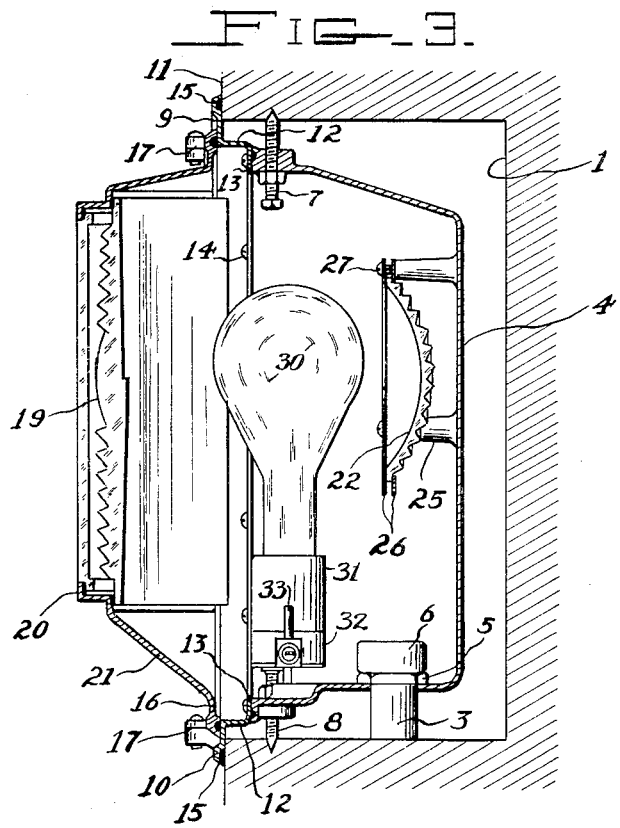
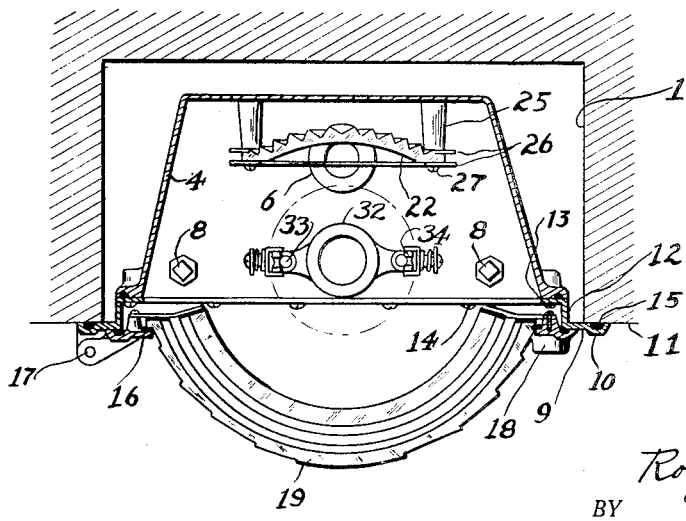
INVENTOR.
Royal E. Crossley
BY Bodell & Thompson
ATTORNEYS.

Patented Nov. 21, 1933

1,936,549

UNITED STATES PATENT OFFICE 1,936,549

ELECTRIC LAMP CONSTRUCTION FOR VIADUCTS

Royal E. Crossley, Syracuse, N. Y., assignor to Crouse-Hinds Company, Syracuse, N. Y., a corporation of New York Application August 14, 1930. Serial No. 475,236

7 Claims. (Cl. 240—1)

This invention relates to electric lamps for illuminating roadways, sidewalks etc., and located close to the ground, or in the curb.

The invention consists in the novel features and in the combinations and constructions hereinafter set forth and claimed.

In describing this invention, reference is had to the accompanying drawings in which like characters designate corresponding parts in all the views.

Figures 3 and 4 are respectively vertical and cross sectional views taken centrally of Figure 2.

Figure 1:
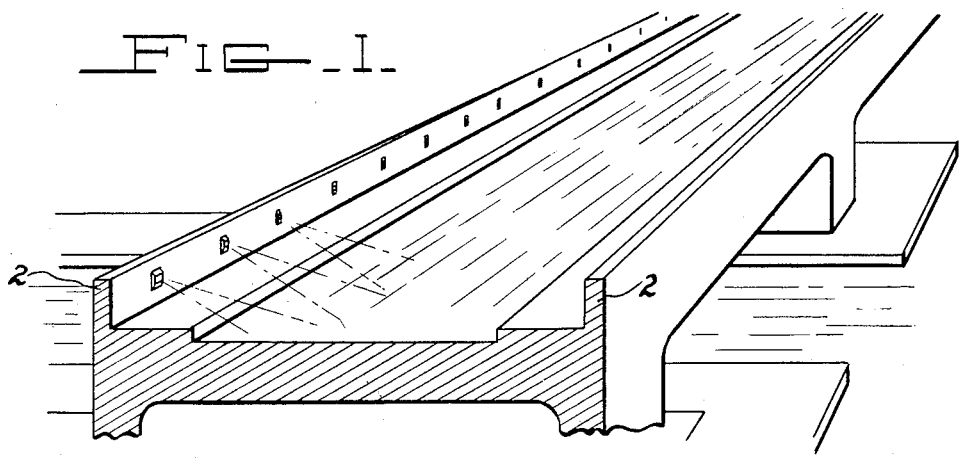
Figure 1 is a perspective view of a viaduct provided with my lamp.
Figure 2:
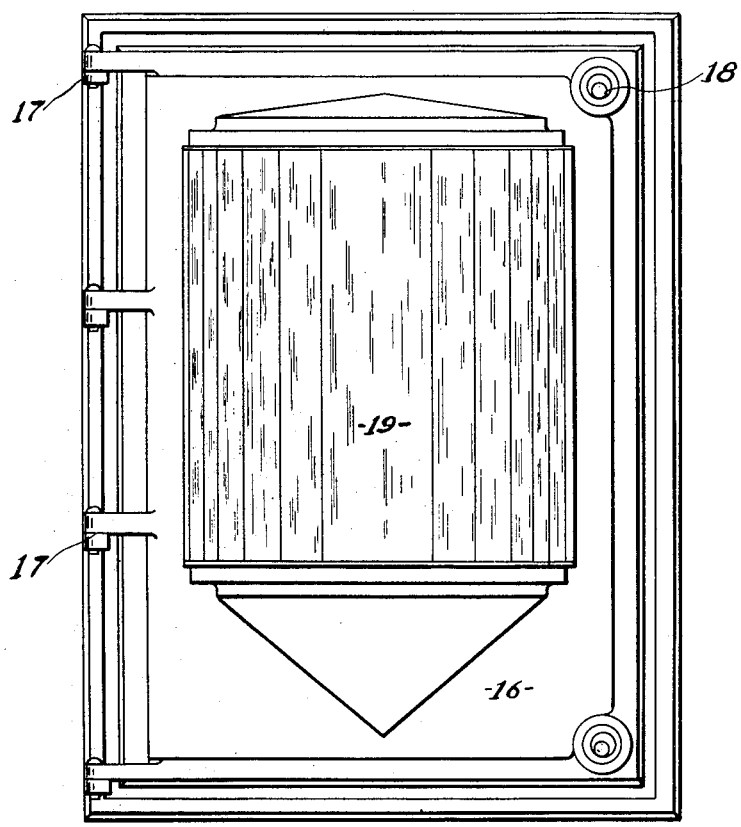
Figure 2 is a front elevation of the lamp.

The lamp unit comprises generally, a box open at its front side and having means for supporting a lamp, the box also having adjustable means for locating and securing it in a recess, as a recess in a curb or balustrade, a face plate as a door frame lapping the outer face of the wall of the recess, and having means for securing it to the open side of the box so that when the box is located and secured in the recess, the face plate or door frame will be clamped against the outer edge wall of the recess, and the floor carried by the frame.

1 designates a recess formed in the side of a curb 2, or other upright wall of a concrete structure, as a viaduct in which are embedded conduits enclosing electric wires, the conduits having branches as 3 extending through one of the walls of the recess, as the bottom wall.

4 is a box or housing open at its front side, this having an opening for receiving the conduit end 3, the box being secured to the conduit in any suitable manner, as by a nut 5. The conduit has a suitable bushing 6 at its upper end.

7 and 8 are set screws threaded in opposite walls, as the upper and lower walls of the box, these having points for entering the upper and lower walls of the recess 1, they being adjustable to locate the box in proper relation to the conduit 3. There are preferably four of such screws; two at the top and two at the bottom of the box 4. Lock nuts are provided to hold the screws 7, 8 in fixed position.

9 is a face plate or door frame having a flange 10 overlapping the margin of the face 11 of the curb, or other support, around the open end of the recess 1, and an inwardly extending flange 12 having an annular lip 13 which is secured to the edge wall at the open side of the box by clamping means as screws 14.

A suitable gasket 15 is interposed between the flange 10 and the underlying wall of the curb or support.

16 designates a door hinged at 17 to the door frame and held in closed position by any suitable means, designated generally 18. The construction of this means 18 forms no part of this invention. The door supports a cylindrical Fresnel lens 19 and is provided with a suitable hood portion 20 and base portion 21 constituting a frame in which the lens is mounted. Also, a reflector 22 is mounted on the back of the box in the rear of the lamp. The reflector 22 is carried by suitable studs 25 projecting from the back of the box, and is held in position between two flat rings 26 by screws 27 extending through the rings and into the ends of the studs.

These lamps are spaced a suitable distance apart along the viaduct. When the viaduct is constructed, the electric conduits are embedded therein with branches projecting upwardly into the recess 1. The distance these branches project into the recess varies slightly and the lamp or the box 4 must be made to conform to these variations. By reason of the set screws 7 and 8, the box can be located in the recess to conform to the variations in the pipes 3 and firmly anchored therein by the set screws 7.

The lamp 30 is carried by a suitable lamp socket 31 which is adjustable vertically to make provision for the use of different length lamps. The lamp socket 31 is mounted upon a carriage 32 which is adjustable on the vertical studs 33. The carriage 32 is provided with spring pressed rollers 34. These rollers cooperate with the studs 33 and provide a friction means for holding the carriage 32 in its adjusted position. This construction affords an easily adjustable support for the lamp 30 whereby the light source may be brought into the focus of the reflector 22.

By my invention, lamps are readily applied to the conditions in regard to the recess and the pipes 3 in which they are to be mounted.

What I claim is:

1. An electric lamp unit for mounting in a recess, the unit comprising a box open at its front side and having adjustable means for supporting an electric lamp, the box having adjustable means for engaging the walls of the recess for locating the box therein, a door frame having a flange lapping the front edge of the wall of the recess, and a flange extending into the recess, and means cooperating with the front open side of the box for securing the latter flange to the same, and a door carried by the frame.

2. An electric lamp unit for mounting in a recess having an electrical conduit extending thereinto for enclosing the service wires, the lamp unit comprising a box having means for connection to said conduit, and means for locating the box in said conduit including set screws coacting with opposing walls of the recess, the set screws coacting with the conduit to hold the box in the recess, the box having means for supporting a lamp, a face plate having a flange overlying the outer face of the wall of the recess, and an inwardly extending flange coacting with the open side of the box, and means coacting with the open side of the box for clamping the face plate against the same and thereby pressing the first mentioned flange against the open side of the recess.

3. An electric lamp unit for mounting in a recess having a rigid electrical conduit extending thereinto for enclosing the service wires, the lamp unit comprising a box having means for connection to said conduit, and means for locating the box in said conduit including set screws coacting with opposing walls of the recess, the set screws coacting with the conduit to hold the box in the recess, the box having means for supporting a lamp, a face plate having a flange overlying the outer face of the wall of the recess, and an inwardly extending flange coacting with the open side of the box, and means coacting with the open side of the box for clamping the face plate against the same and thereby pressing the first mentioned flange against the open side of the recess, and a door carried by the face plate.

4. The combination of a wall formed with a recess open at one side, an electrical conduit extending into the bottom of the recess, an electric lamp unit comprising a box open at its front side, the box having means for rigid attachment to the conduit, and adjustable set screws for coacting with opposite walls of the recess and locating the box in the recess, the box having means for supporting an electric lamp, a door frame having a flange lapping the outer edge of the wall of the recess, and a flange extending into the recess and coacting with the edge of the box at the open side thereof, and means for clamping the latter flange to the box, and a door carried by the frame, and having inner and outer spaced apart refracting lenses.

5. An electrical lamp unit for mounting in a recess, the unit comprising a box open at its front side and having means for adjustably supporting an electric lamp and adjustable means for locating and securing the lamp unit within the recess, a face plate having a flange overlying the outer wall of the recess and an inwardly extending flange coacting with the open side of the box, and means for securing the face plate to the open side of the box and pressing the first mentioned flange against the open side of the recess.

6. An electric lamp unit for mounting in a recess having an open side, a reflector carried by the inner rear wall of the box, adjustable means for supporting a source of light in the focal axis of the reflector, a face plate having a flange overlying the wall of the recess and an inwardly extending flange for coacting with the open side of the box and means for securing the face plate to the side of the box and pressing the first mentioned flange against the outer wall of the recess, a door carried by the face plate and adjustable means for locating and securing the box within the recess.

7. The combination of a wall formed with a recess open at one side, of an electric lamp unit for mounting in said recess, said lamp unit including a casing having an open side and being provided with means coacting with the walls of the recess and adjustable for positioning and securing the casing within the recess, said means being self-contained with the casing, a door frame detachably secured to the open side of the casing, said frame closing the space between the walls of the casing and the recess and having a flange overlying the margin of the face of the wall about the opening of the recess, and a door hinged on the door frame and being provided with a projection lens.

ROYAL E. CROSSLEY.